Oct. 19, 1943.  W. BUDDEBERG  2,331,959
CONTROL MECHANISM FOR CENTRIFUGAL MACHINES
Filed July 23, 1938
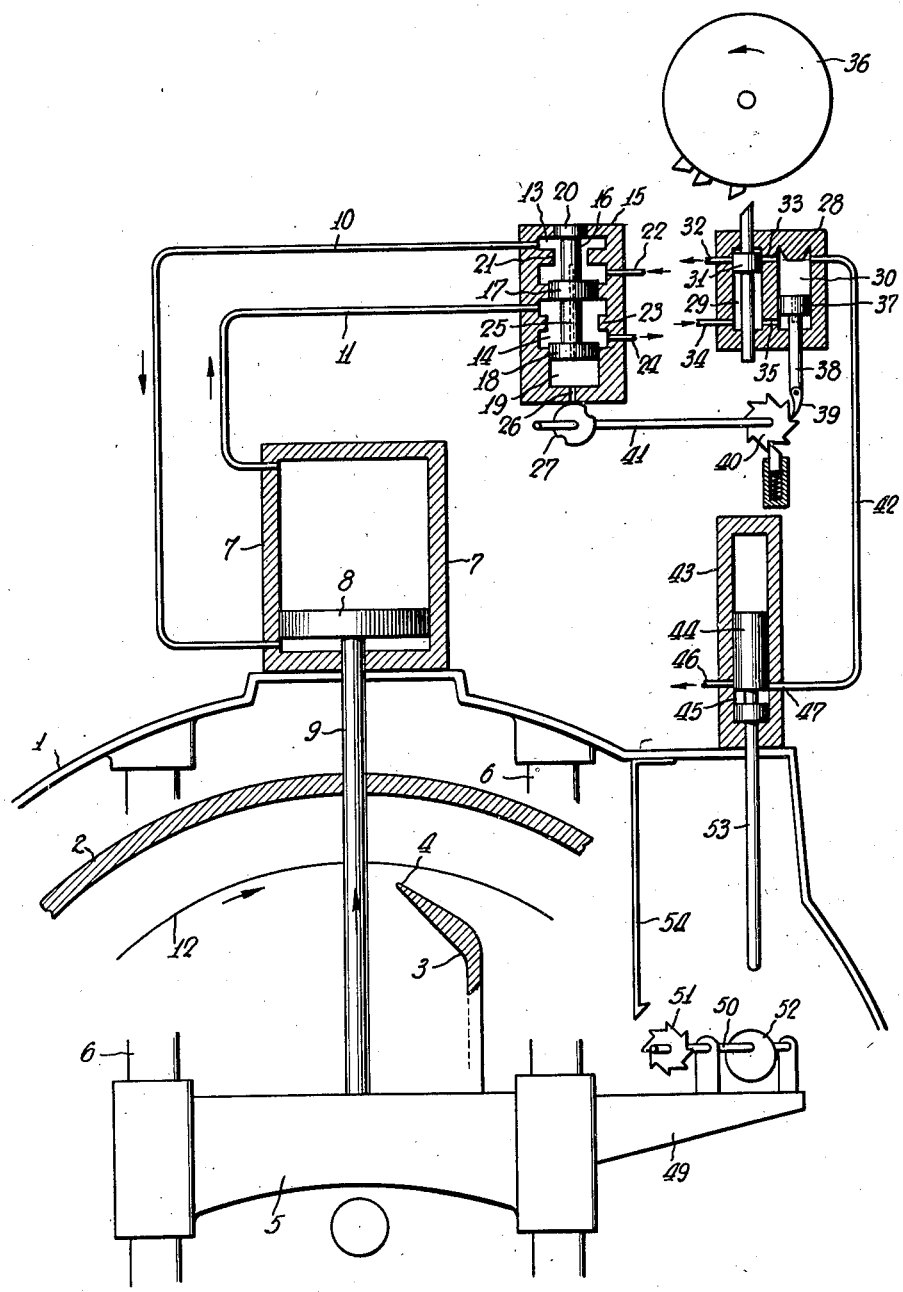
INVENTOR
Walter Buddeberg
BY
Dean Fairbanks Horah
ATTORNEYS Patented Oct. 19, 1943

2,331,959

UNITED STATES PATENT OFFICE 2,331,959

CONTROL MECHANISM FOR CENTRIFUGAL MACHINES

Walter Buddeberg, Ravensburg, Germany, assignor to Albert T. Otto & Sons, Inc., New York, N. Y., a corporation of New York Application July 23, 1938, Serial No. 220,966
In Germany July 31, 1937

12 Claims. (Cl. 210—70)

This invention relates to that type of centrifugal machines in which a scraper, peeler, or other like element is brought into such position in the drum, at the end of the separating step in the cycle of operations, that it engages with the accumulated solid or heavier material, dislodges it and directs it out of the drum preparatory to the admission of further mixture to be treated. A machine of this general type is shown in the ter Meer Patent 1,925,121 issued September 5, 1933.

It is not ordinarily considered desirable to remove all of the accumulated solid from the drum for several reasons. To remove all of the solid necessitates direct contact of the scraper or peeler with the peripheral wall of the drum while the latter is rotating. Such contact may cause damage to the sieve coating or other wall structure as well as dulling, injuring, or breaking the knife edge of the scraper. It is ordinarily desirable to retain a layer of the accumulated material in the drum as a part of the filtering or separating wall as to better insure the retention of fines which might otherwise pass through the separating wall and go out with the liquid.

To insure the retention of at least a minimum layer it is customary to provide a stop for limiting the movement of the scraper or peeler in its outward direction toward the drum wall. Such a stop is shown in Patent 1,871,284 issued August 9, 1932.

After the knife edge of the scraper reaches the extreme outer limiting position determined by the stop, it may be quite an appreciable time before it starts on its return movement and during this time the edge is in contact with the surface of the remaining layer of the material. As the edge comes back to the same position at the end of each successive solid removing phase, it grazes or rubs over the same surface and said surface often becomes hardened and has an undesirable effect on the permeability or filtering properties of the layer. Furthermore, the hardened surface tends to grind off or dull the knife edge of the scraper. Thus, after several cycles of operation, it is ordinarily necessary to wash out the layer or remove it in some other way. Frequent changes of knives due to dulling and frequent washing out and changing of filter cloths delays operations, reduces the output of the machine, and increases the cost of operations.

The main object of this invention is to overcome the disadvantages above referred to. As one important feature of the invention and whereby that object is achieved, there is provided a control mechanism which automatically returns the knife immediately after reaching the extreme position so that prolonged grazing or rubbing on a single surface is avoided. The control mechanism also slightly changes the extreme position of the scraper edge for each cycle of operation so that the thickness of the layer remaining after each solid removing operation is different from each preceding cycle. Thus, the knife operates on a different surface at the end of each cycle and the hardening of any such surface is prevented.

In carrying out the present invention, there is provided a stop for limiting the outward movement of the scraper or peeler and such stop is caused to move through a predetermined cycle which may be so controlled as to give as great or as little difference in the thickness of successive residual layers, and as great or as little difference between maximum or minimum thickness as may be desired.

The invention involves various other novel and useful features, accomplishes other desirable results, and overcomes other disadvantages, all of which will be apparent from or pointed out in the following description, or will be apparent from the accompanying drawing which shows only one of many embodiments which may be employed within the scope of the present invention as defined in the appended claims.

In the drawing the single figure shows a portion only of a standard type of a centrifugal separator and shows a control mechanism somewhat diagrammatically and partly in section for accomplishing the new and desired results. The separator illustrated includes a casing 1 within which is mounted a centrifugal separating drum having a peripheral wall 2 which may be perforated or provided with any suitable type of filtering or separating membrane or media. Within the drum is mounted a scraper or peeler 3 which has a knife edge 4 movable substantially radially of the drum and serving to dislodge or cut off solid material accumulating on the peripheral wall, and to deliver it through a suitable chute or conduit to the exterior of the drum. The scraper or peeler is mounted on a cross rail 5 vertically movable on guides 6. This movement may be effected by means of a cylinder 7 mounted on the frame and having a piston 8 connected by a piston rod 9 to the cross rail 5. Pressure fluid may be delivered through either a conduit 10 connected to the lower end of the cylinder or a conduit 11 connected to the upper end of the cylinder, and by controlling the flow of the pressure fluid to one end and permitting discharge from the other end the scraper may be alternately raised and lowered. The normal operation of these parts may be substantially the same as in the patents above referred to and other patents of Gustav ter Meer. Such operation is briefly as follows:

The mixture of liquid and solid is delivered to the drum while the scraper or peeler is in the lowermost position as shown in the drawing. After the charge has been admitted the inlet valve is shut off and the rotation of the drum continued until the solids have been accumulated by the action of centrifugal force as a layer pressed against the peripheral wall 6. A skimmer may then be introduced to remove the clear liquid in case the peripheral wall is not a filtering wall. The scraper is then moved outward radially until the knife 4 engages the accumulated layer of solid material, the inner surface of which may be indicated by the line 12. The solids are deflected inwardly by the scraper and delivered through a suitable chute or conduit and outward radial movement of the scraper is continued until the layer of solid material has been reduced to the desired amount. The scraper is then moved inward radially and a fresh charge is admitted to the drum.

The present invention relates primarily to the means for controlling this outward and inward movement of the scraper and such control mechanism may include certain of the control mechanism illustrated in the ter Meer Patent 1,985,589. In the mechanism of the last mentioned patent the outward and inward movement of the scraper is controlled solely by the action of a control disc which may be driven at the desired relatively low speed so that one complete revolution of the disc will correspond to a complete cycle of operations in the drum. In that mechanism the outward movement of the scraper is initiated by one control pin on the disc and the return movement is initiated by another control pin. Thus, there is necessarily quite an interval of time during which the scraper remains in its outermost position and prior to the operation of the next pin to start the inward movement of the scraper.

In the present invention I utilize a similar control disc for initiating the outward movement of the scraper but provide independent means controlled by the scraper itself for initiating the return movement and thereby reduce to the minimum the period during which the scraper is at its outer limiting position. There is also provided means whereby the extent of the outward movement of the scraper will be changed for each successive cycle to avoid the retention of a fixed and predetermined layer in the drum, and the surface of which may become glazed or hardened by repeated scrapings.

In the improved construction illustrated, the pipes 10 and 11 are connected to separate chambers 13 and 14 in a valve block 15. Within this valve block is a valve member 16 with a transverse piston-like disc 17 for separating the two chambers, a terminal piston 18 slidable in a cylinder 19, and a second terminal piston 20 for closing the end of the valve block or for coacting with an inwardly directed flange 21 to separate the upper chamber into two compartments. The valve block is provided with an inlet 22 to the upper chamber below the flange 21, the conduit 10 enters the upper compartment above the flange 21, the conduit 11 enters the lower compartment 14 above an inwardly directed flange 23 which may engage the piston member 17, and an outlet 24 leads from the lower compartment 14 below said flange 23. The valve member is provided with a passage 25 leading lengthwise therethrough and having its upper end normally communicating with the upper compartment 13 and its lower end communicating with the cylinder 19. The cylinder 19 has an outlet port 26 which is controlled by a rotary disc 27.

With the parts in the position shown in the drawing the pressure fluid entering the inlet 22 has flowed through the passage 25 to the cylinder 19, and as the port 26 is closed the valve member has been lifted to its uppermost position so that the pressure fluid may flow through the upper chamber 13 and pipe 10 to the lower end of the cylinder 7, and the fluid in the cylinder above the piston may escape through the pipe 11, the chamber 14, and the outlet 24. The scraper is thus at the beginning of its upward or outward radial stroke. This construction of valve block, valve and outlet control disc may be substantially the same as shown in the ter Meer Patent 1,985,589.

In addition to the valve mechanism above referred to there is a second valve mechanism including a valve block 28 having two cylinders 29 and 30 therein. In the cylinder 29 is a piston 31 which may close an outlet port 32 and at the same time close a port 33 connecting the upper ends of the two cylinders. The lower end of the cylinder 29 has an inlet port 34 for pressure fluid and a port 35 maintaining the lower ends of the two cylinders 29 and 30 in open communication with each other at all times. The piston 31 has its piston rod projecting beyond the end of the valve block 28 and presenting a cam surface which may be engaged by a control pin on a rotating disc 36. In the cylinder 30 is a piston 37 with its piston rod 38 provided with a pawl 39 engaging a ratchet disc 40 on a shaft 41 which carries the disc 27. The piston 37 has a small passage connecting the upper and lower sides thereof and the upper end of the cylinder 30 is provided with an outlet conduit 42. The disc 36 is driven from any suitable source of power independent of the drive mechanism of the separator, and for this purpose there may be provided an electric motor with suitable reduction gearing, which motor may also operate the pumps for supplying pressure fluid to the ports 22 and 34. This may be substantially as shown in the ter Meer Patent 1,985,589.

Mounted on the frame of the separator is a cylinder 43 having a piston 44 with an annular groove 45 which may be brought into or out of registry with an outlet port 46 and with a port 47 connected to the conduit 42.

Mounted on a bracket 49 on the cross rail 5 is a shaft 50 carrying a ratchet disc 51 and an eccentric disc 52. The disc 52 is mounted in alignment with a piston rod 53 connected to the piston 44 and the ratchet disc 51 is so mounted that its periphery may move into and out of engagement with a spring pawl 54 mounted on the frame of the machine.

When the scraper 3 is in its lowermost position the ratchet disc 51 is below and out of engagement with the spring pawl 54 and the eccentric disc 52 is below and out of engagement with the rod 53. As the scraper is raised by the action of the piston 8, the ratchet moves past the pawl 54 without being rotated and the upward movement continues until the edge of the eccentric disc 52 engages with the lower end of the piston rod 53. Thereafter the movement continues until the annular groove 45 in the piston 44 is lifted to such position that it connects the ports 46 and 47 and thus permits the escape of pressure fluid from the upper end of the cylinder 30. Upon the release of pressure from above the poston 37, the high pressure fluid entering the inlet 34 and passing through the port 35, lifts the piston 37 to the upper end of its stroke. The valve block 28 or the piston 37 is so constructed or provided with a suitable stop whereby the piston 37 in its uppermost position in the cylinder 30 does not close the port 33 or the port leading to the pipe 42. The upward movement of the scraper as well as the eccentric disc 52 continues until the annular groove 45 moves out of registry with the ports 46 and 47 and the lower portion of the piston closes these ports. This stops the further escape of pressure fluid from the upper end of the cylinder 30, and the fluid under pressure entering through the ports 34 and 35 will flow through the restricted passage in the piston 37 to the upper surface of the latter which is larger in area than the lower surface and the piston 37 is immediately forced down. During its downward movement the pawl 39 engages the ratchet 40 and rotates the latter to bring a notch of the disc 27 into registry with the port 26 and permits the escape of pressure fluid from the cylinder 19. The pressure fluid entering the inlet 22 acts on the piston disc 17 and forces it down to the position where it registers with the flange 23. The piston 20 then closes the space through the flange 21 and the pressure fluid may flow from the pipe 22 through the conduit 11 to force the piston downwardly to its lowermost position. It remains in this position until the slow rotation of the disc 36 brings a control pin into contact with the piston rod 34 to force the latter downwardly. The pressure fluid in the upper end of the cylinder 30 can then escape through the passages 32 and 33 and the piston 37 will again rise. When the end of the piston rod 34 snaps past the control pin and the piston rises by reason of the pressure of the fluid delivered through the pipe 34, the passages 32 and 33 are again closed and the pressure can act upon the upper side of the piston 37 to force the latter downwardly and again rotate the ratchet 40 and the disc 37. This rotation brings the disc 27 to such position that it closes the port 26 and the supply of pressure fluid from the inlet 22 through the passage 25 in the valve member will lift the valve member to the position shown in the drawing.

From the foregoing, it will be seen that the reversal of flow of pressure fluid to the opposite sides of the piston 8 is controlled by the disc 27 and the rotation of this disc is affected by the pawl 39 and piston 37. The escape of pressure from the cylinder 30 to initiate the up movement of the scraper is mechanically controlled by the disc 36 acting on the piston 30, whereas the escape of fluid from the cylinder 30 to initiate the down movement of the scraper is affected by the up movement of the scraper itself acting through the disc 52 and the rod 53. Thus, the beginning of successive scraping operations is dependent upon the speed of rotation of the disc 36 and the spacing of the pins thereof, whereas the time interval between the end of the upstroke of the scraper and the beginning of the downstroke is entirely independent of the speed of the disc 36 and is controlled by the scraper itself.

It has been previously noted that the disc 52 is eccentric. If a fixed portion of a scraper carrying mechanism engaged the piston rod 53, then the scraper would always stop in the same uppermost position and a layer of predetermined thickness would remain on the scraper after each scraping operation. By reason of the fact that the disc 52 is eccentric and is rotated by a step by step movement, one step being during each down stroke of the scraper, it will be apparent that with the disc 52 rotated clockwise from the position shown in the drawing, each successive upward movement of the scraper will bring the disc into engagement with the rod 53 at an earlier point in the stroke than it did on the previous stroke and the valve mechanism will be reversed sooner and a thicker layer will be permitted to remain on the drum wall. After the disc 52 has been rotated one-half revolution with gradually increasing residual layers the opposite effect begins and each successive stroke of the scraper will be to a higher point and will reduce the thickness of the residual layer. Thus, after no two successive upstrokes of the scraper will there remain the same thickness of layer, and no two successive final positions of the scraper will be the same and the formation of a hardened glazed surface on the residual layer is entirely avoided.

As previously noted various other forms of mechanism may be employed for accomplishing the main objects of my invention which are to make the time of return of the scraper independent of the length of the time cycle of operations, and to vary the thickness of successive layers of residual material.

Although the disc 27 in the present invention, is shown as actuating only the valve to initiate the outward movement of the scraper, it will be understood that this same disc may also actuate valves to control the admission of material to the scraper for moving a skimmer into and out of operative position, and for other purposes as indicated in Patent 1,985,589 above referred to.

Having thus described my invention, what I claim as new and desire to secure by Letters Patent is:

1. A centrifugal machine having a scraper for removing solid material, means for moving said scraper into and out of operative position, an adjustable stop connected to and movable with said scraper, means for automatically varying the limiting operative position of said scraper in accordance with the adjusted position of said stop, and means for adjusting said stop to different positions automatically during different cycles of operation of said scraper.

2. A centrifugal machine having a peripheral wall, a scraper for removing solid materials therefrom, means for moving said scraper into and out of operative position, an eccentric movable with said scraper, and means for initiating the operation of said moving means in limiting operative position of said scraper to effect return movement of said scraper from said position, and including a control member in the path of movement of said eccentric, and in position to be engaged and actuated by said eccentric when said scraper reaches said limiting position, means actuated by relative movement of said scraper and said wall to adjust said eccentric and thereby engage said control member at different limiting operative positions of said scraper.

3. A centrifugal machine having a scraper for removing solid materials, means for moving said scraper into and out of operative position, an eccentric movable with said scraper, means for initiating the operation of said moving means in limiting operative position of said scraper to effect return movement of said scraper from said position, and including a control member in the path of movement of said eccentric, and in position to be engaged and actuated by said eccentric when said scraper reaches said limiting position, and means for rotating said eccentric into different positions automatically during different cycles of operation of said scraper, to engage said control member at different limiting operative positions of said scraper.

4. A centrifugal machine having a scraper for removing solid materials, means for moving said scraper into and out of operative position, an eccentric movable with said scraper, means for initiating the operation of said moving means in limiting operative position of said scraper to effect return movement of said scraper from said position, and including a control member in the path of movement of said eccentric, and in position to be engaged and actuated by said eccentric when said scraper reaches said limiting position, and means for imparting a step by step rotation to said eccentric automatically during successive movements of the scraper in one direction to effect actuation of said control member at different limiting operative positions of said scraper.

5. A centrifugal machine having a scraper for removing solid materials, means for moving said scraper into and out of operative position, an eccentric movable with said scraper, means for initiating the operation of said moving means in limiting operative position of said scraper to effect return movement of said scraper from said position, and including a control member in the path of movement of said eccentric, and in position to be engaged and actuated by said eccentric when said scraper reaches said limiting position, and pawl and ratchet means for imparting a step by step rotation to said eccentric automatically during successive return movements of said scraper away from operative position, to effect actuation of said control member at different limiting operative positions of said scraper.

6. A centrifugal machine having a scraper, fluid actuated means for moving said scraper into and out of operative position, a pair of rotary members, means for operating one of said members independently of the machine for effecting movement of the scraper towards operative position at predetermined time intervals, and means responsive to the movement of said scraper for rotating the other member for variably limiting the extent of movement of the scraper towards limiting operative position in accordance with the rotative position of said last mentioned member.

7. A control mechanism for centrifugal separators having a member for removing material from said separator, fluid actuated means for reciprocating said member, valve mechanism for the fluid of said means, a pair of independent pistons, means responsive to the axial movement of said pistons for controlling said valve mechanism, means for actuating one of said pistons axially in predetermined time cycles to initiate movement of said member towards material removing position, and means for actuating the other piston axially in response to the movement of said member to initiate return movement of said member.

8. A centrifugal machine having a scraper for removing solid materials, means for moving said scraper into and out of operative position, a rotatable eccentric, and means having a control member relatively moved with respect to said eccentric in response to the movement of said scraper and adapted to engage said eccentric during said scraper movement for varying the limiting operative position of said scraper in accordance with the rotative position of said eccentric.

9. A centrifugal machine having a scraper for removing solid materials, means for moving said scraper into and out of operative position, an eccentric, means having a control member relatively moved with respect to said eccentric in response to the movement of said scraper and adapted to engage said eccentric during said scraper movement for automatically varying the limiting operative position of said scraper in accordance with the rotative position of said eccentric, and means for rotating said eccentric into different positions automatically during different cycles of operation of said scraper.

10. A centrifugal machine having a scraper for removing solid materials, means for moving said scraper into and out of operative position, an eccentric member, a control member, means responsive to the actuation of said control member for initiating the operation of said moving means in limiting operative position of said scraper to effect return movement of said scraper from said position, one of said members being mounted for movement with said scraper and in position to be engaged by the other member to effect actuation of said control member when said scraper reaches said limiting position, and means for rotating said eccentric member into different positions automatically during different cycles of operation of said scraper, to effect actuation of said control member at different limiting operative positions of said scraper.

11. A centrifugal machine comprising a rotatable drum, a scraper mounted for movement into and out of operative position adjacent to the wall of said drum to intermittently remove solids therefrom, a stop connected to and movable with said scraper, means having a part in the path of movement of said stop for initiating movement of said scraper away from said drum when said part is contacted by said stop, and means for adjusting said stop to contact said part at different positions of said scraper in its travel toward operative position.

12. A centrifugal machine comprising a rotatable drum, a scraper mounted for movement into and out of operative position adjacent to the wall of said drum to intermittently remove solids therefrom, a stop connected to and movable with said scraper, means having a part in the path of movement of said stop for initiating movement of said scraper away from said drum when said part is contacted by said stop, means for adjusting said stop to contact said part at different positions of said scraper in its travel toward operative position, and a control member for operating said adjusting means automatically and intermittently during movement of said scraper.

WALTER BUDDEBERG.